United States Patent
Gretz (10) Patent No.: US 7,166,801 B1
(45) Date of Patent: Jan. 23, 2007

(54) ELECTRICAL BOX ASSEMBLY FOR RECESSING AN ELECTRICAL DEVICE

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/356,590

(22) Filed: Feb. 16, 2006

Related U.S. Application Data (63) Continuation-in-part of application No. 11/264,857, filed on Nov. 2, 2005, which is a continuation-in-part of application No. 11/246,985, filed on Oct. 7, 2005, which is a continuation-in-part of application No. 11/185,256, filed on Jul. 20, 2005, which is a continuation-in-part of application No. 11/102,392, filed on Apr. 8, 2005, now abandoned, which is a continuation-in-part of application No. 11/070,344, filed on Mar. 2, 2005, now Pat. No. 6,965,078, which is a continuation-in-part of application No. 11/009,116, filed on Dec. 10, 2004, now Pat. No. 7,005,578, which is a continuation-in-part of application No. 10/863,942, filed on Jun. 9, 2004, now Pat. No. 6,956,171.

(51) Int. Cl.
*H01H 9/02* (2006.01)
(52) U.S. Cl. ............... 174/53; 174/58; 174/50; 174/481; 220/3.2; 220/3.3; 248/906
(58) Field of Classification Search ............. 174/48, 174/49, 50, 53, 57, 58, 66, 67, 480, 481; 220/3.2, 3.3, 3.4, 3.5, 3.6, 3.7, 3.8, 4.02, 220/241, 242; 248/96, 906, 343; 439/535, 439/536, 537, 538; D13/152
See application file for complete search history.

(56) References Cited

U.S. PATENT DOCUMENTS

| | | | |
|---|---|---|---|
| 4,265,365 A | 5/1981 | Boteler | |
| 4,915,638 A * | 4/1990 | Domian | 174/67 |
| 4,988,832 A | 1/1991 | Shotey | |
| 5,012,043 A * | 4/1991 | Seymour | 174/57 |
| 5,171,939 A * | 12/1992 | Shotey | 174/57 |
| 5,218,169 A | 6/1993 | Riceman | |
| 5,228,584 A * | 7/1993 | Williams, Jr. | 220/3.3 |
| 5,293,003 A * | 3/1994 | Prairie, Jr. | 174/57 |
| 5,527,993 A | 6/1996 | Shotey et al. | |
| 5,578,791 A * | 11/1996 | Bosse, Jr. | 174/48 |
| 6,457,843 B1 * | 10/2002 | Kester et al. | 439/136 |
| 6,737,575 B2 * | 5/2004 | Pyron | 174/58 |
| 6,737,576 B1 | 5/2004 | Dinh | |

* cited by examiner

*Primary Examiner*—Angel R. Estrada (57) ABSTRACT

A two-piece electrical box assembly for recessing a duplex receptacle or similar electrical device within a wall. An inner box portion is constructed of metal and includes sidewalls and a back wall defining a cavity therein. The cavity is capable of receiving the electrical device therein. An outer box portion includes an outward extending flange and provides a protective enclosure surrounding the inner box portion and the electrical device within the inner box portion. The electrical box assembly is capable of recessing into a hole in a wall until the outward extending flange is flush with the wall. A cover on the outer box portion can be closed to provide a rainproof enclosure therein for the plug ends of electrical cords while they are connected to the electrical device.

15 Claims, 11 Drawing Sheets

ELECTRICAL BOX ASSEMBLY FOR RECESSING AN ELECTRICAL DEVICE

This application is a Continuation-In-Part of U.S. patent application Ser. No. 11/264,857 filed Nov. 2, 2005 and still pending, which is a Continuation-In-Part of U.S. patent application Ser. No. 11/246,985, filed Oct. 7, 2005 and still pending, which is a Continuation-In-Part of U.S. patent application Ser. No. 11/185,256, filed Jul. 20, 2005 and still pending, which is a Continuation-In-Part of U.S. patent application Ser. No. 11/102,392, filed Apr. 8, 2005 now abandoned, which is a Continuation-In-Part of U.S. patent application Ser. No. 11/070,344, filed Mar. 2, 2005 and now U.S. Pat. No. 6,965,078, which is a Continuation-In-Part of U.S. patent application Ser. No. 11/009,116 filed Dec. 10, 2004 now U.S. Pat. No. 7,005,578, which is a Continuation-In-Part of U.S. patent application Ser. No. 10/863,942 filed Jun. 9, 2004 and now U.S. Pat. No. 6,956,171.

FIELD OF THE INVENTION

This invention relates to assemblies for the mounting of electrical devices and specifically to a recessed outlet box that includes a metal electrical box portion and a plastic front portion for providing a front cavity for housing and protecting an electrical device therein.

BACKGROUND OF THE INVENTION

Recessed electrical boxes for retrofitting on finished walls or for use in new construction were disclosed in U.S. Pat. Nos. 6,965,078 and 6,956,171 and in co-pending U.S. application Ser. Nos. 11/009,116, 11/264,857, 11/246,985, 11/185,256, and 11/102,392, all of which are commonly owned by the assignee of the present invention and the entire contents of which are incorporated herein by reference.

The recessed electrical boxes disclosed in the aforementioned patents and applications comprised an electrical box having an inner enclosure for housing an electrical device and an outer enclosure for recessing the inner enclosure well within a wall. The recessed electrical box including the inner enclosure and outer enclosure were either integrally formed in one piece or provided in two pieces each formed of the same material of construction.

Although a recessed electrical box of the type described in the aforementioned disclosures provided an adequate means for recessing an electrical device substantially within the wall of a structure, they did not address the needs of certain localities in which the electrical code has additional restrictions. The electrical code in certain localities, for example, requires that an electrical box be constructed of metal to ensure more positive grounding for the electrical connections therein in case of a short within the box.

Accordingly, the present invention provides a two-piece recessed electrical box that includes a metal inner box for surrounding and housing the electrical connections. An outer box portion includes a cover member for protecting the inner box, the outlet installed within the inner box, and the electrical cords while they are in use and plugged into the outlet within the inner box. The outer box portion may be constructed of metal or plastic.

SUMMARY OF THE INVENTION

The invention is a two-piece electrical box assembly for recessing a duplex receptacle or similar electrical device within a wall. An inner box portion is constructed of metal and includes sidewalls and a back wall defining a cavity therein. The cavity is capable of receiving the electrical device therein. An outer box portion includes an outward extending flange and provides a protective enclosure surrounding the inner box portion and the electrical device within the inner box portion. The electrical box assembly is capable of recessing into a hole in a wall until the outward extending flange is flush with the wall. A cover on the outer box portion can be closed to provide a rainproof enclosure therein for the plug ends of electrical cords while they are connected to the electrical device.

OBJECTS AND ADVANTAGES

A first object of the recessed electrical box assembly of the present invention is to provide an electrical box that positions an electrical device well within an exterior wall, thereby shielding the electrical device from impacts.

A second object is to provide an electrical box assembly including a cover that shields the electrical device and any electrical cords plugged therein from rain and other environmental elements.

A further object of the present invention is to provide a two-piece electrical box assembly that includes an inner box portion constructed of metal for providing positive grounding for electrical connections and electrical devices therein.

These and other objects and advantages of the present invention will be better understood by reading the following description along with reference to the drawings.

TABLE OF NOMENCLATURE

The following is a listing of part numbers used in the drawings along with a brief description:

| Part Number | Description |
| --- | --- |
| 20 | electrical box assembly |
| 22 | inner box |
| 24 | outer box |
| 26 | electrical device |
| 28 | sidewalls of inner box |
| 30 | front edge |
| 32 | sidewalls of outer box |
| 34 | rear abutment surface |
| 35 | fastening arrangement |
| 36 | cover |
| 38 | front opening of inner box |
| 40 | panel |
| 42 | fastener receiving aperture |
| 44 | electrical contact point |
| 46 | back wall of inner box |
| 48 | removable wall portions |
| 50 | line at planar front edge |
| 52 | grounding screw |
| 54 | rear edge of outer box |
| 56 | partial back wall of outer box |
| 58 | rear opening of outer box |
| 60 | rear surface |
| 64 | pin |
| 66 | top end of sidewalls of outer box |
| 68 | aperture in partial back wall |
| 70 | tab |
| 72 | flange |
| 74 | rear surface of flange |
| 76 | mounting arrangement |
| 78 | mounting aperture in flange |
| 80 | mounting fastener |
| 82 | electrical contact point on outer box |
| 86 | front panel of cover |
| 88 | sidewalls of cover |
| 90 | ear |
| 92 | aperture in ear |
| 93 | latch arrangement |
| 94 | latch |
| 96 | opening in latch |
| 98 | surface on latch |
| 100 | rear edge of cover sidewall |
| 102 | U-shaped slots in cover |
| 104 | longitudinal axis of pin |
| 106 | base portion of pin |
| 108 | tip portion of pin |
| 110 | fastener |
| 111 | electrical box |
| 112 | front edge of outer box |
| 114 | U-shaped slots in outer box |
| 116 | circular opening |
| 118 | hole |
| 120 | surface of building |
| 124 | electrical device fastener |
| 126 | face plate |

DETAILED DESCRIPTION OF THE INVENTION

Figure 16:
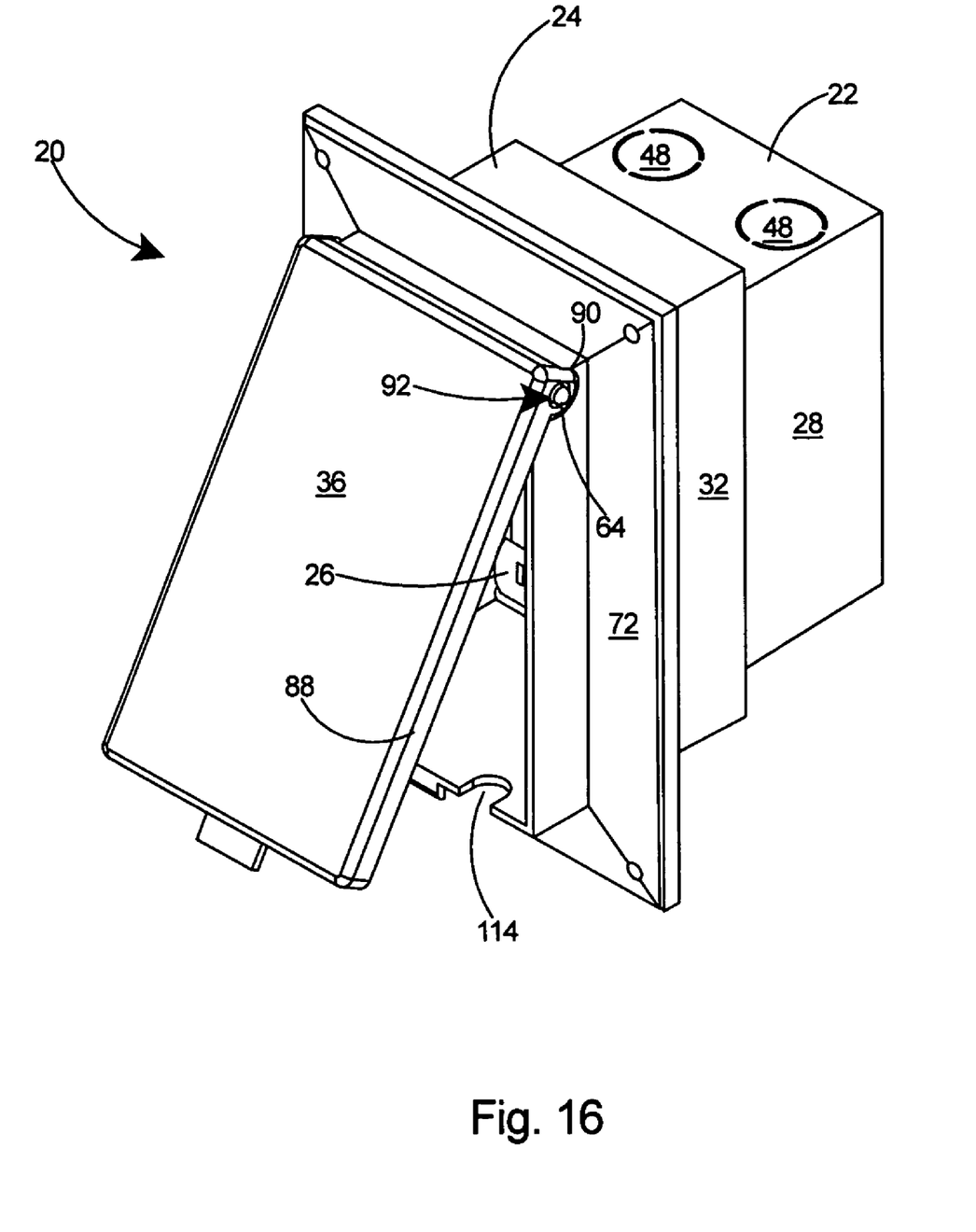
FIG. 16 is a perspective view of the recessed electrical box assembly of the present invention.

With reference to FIG. 16, the present invention comprises an electrical box assembly 20 including an inner box 22 and an outer box 24. The electrical box assembly 20 is used for recessing an electrical device 26 (partially shown) within a wall.

Figure 1:
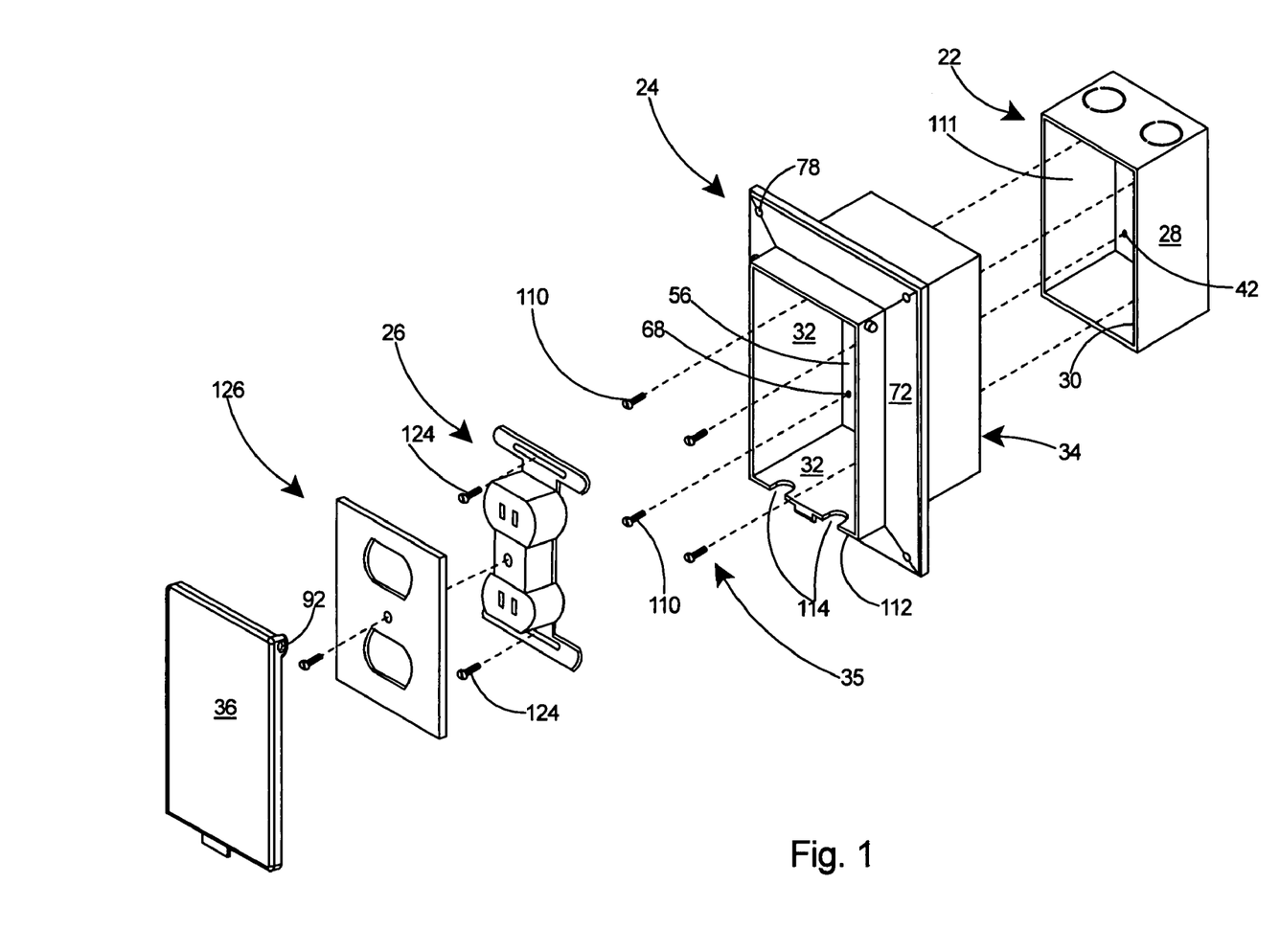
FIG. 1 is an exploded perspective view of a preferred embodiment of the recessed electrical box assembly according to the present invention along with a duplex outlet and its complementary faceplate.

Referring to FIG. 1, the inner box 22 includes sidewalls 28 that terminate in a front edge 30. The outer box 24 includes sidewalls 32 and a rear abutment surface 34. A fastening arrangement 35 is provided for securing the outer box 24 to the inner box 22. The outer box 24 is secured to the inner box 22 in such a manner that the rear abutment surface 34 of the outer box 24 abuts the front edge 30 of the inner box 22. A cover 36, shown exploded away from the outer box 24 in FIG. 1, will be pivotally attached to the outer box 24.

Figure 2:
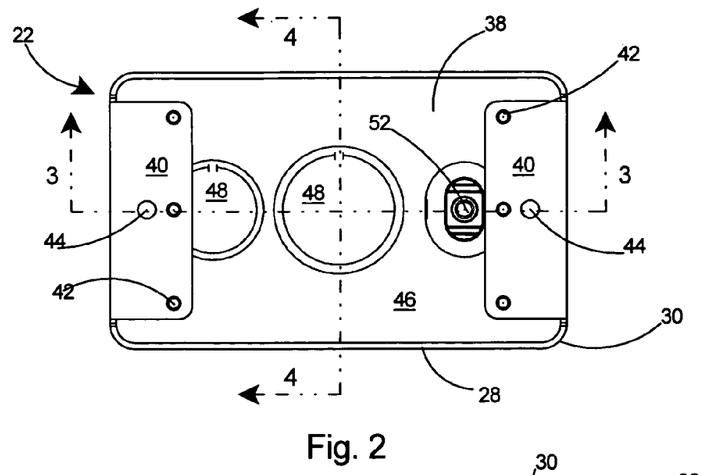
FIG. 2 is a front view of the inner box portion of the electrical box assembly of FIG. 1.
Figures 3, 4:
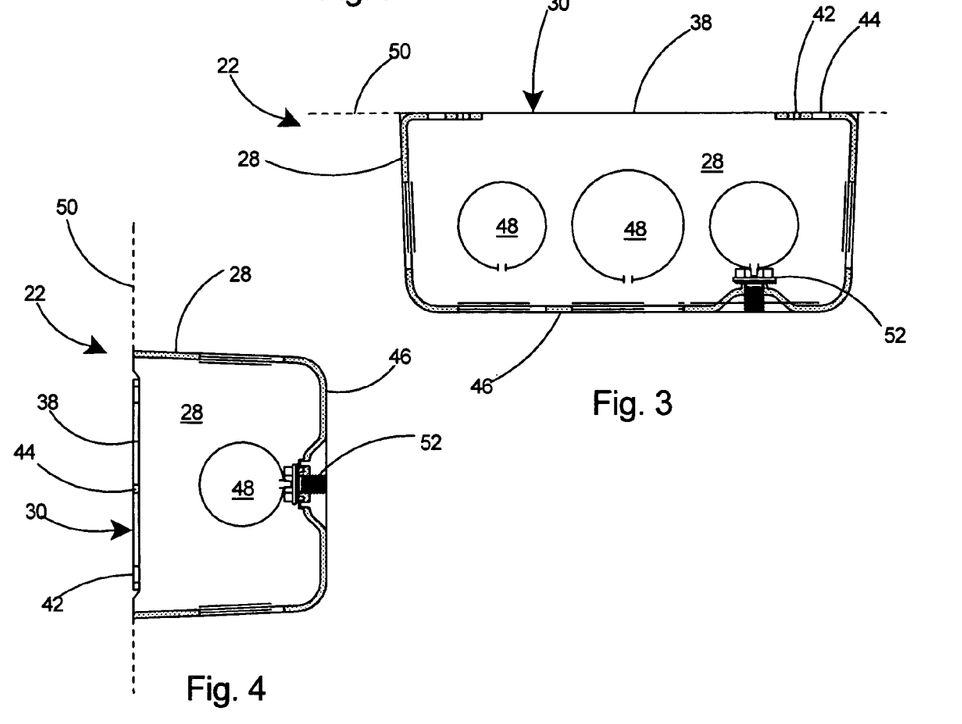
FIG. 3 is sectional view of the inner box taken along line 3—3 of FIG. 2.
FIG. 4 is sectional view of the inner box taken along line 4—4 of FIG. 2.

With reference to FIGS. 2–4, the inner box 22 includes a front opening 38 and panels 40 that extend orthogonally from the front edge 30 of the inner box 22 into the front opening 38. The inner box 22 is preferably constructed of metal to enable the inner box 22 to provide positive grounding for electrical connections and electrical devices (not shown) that will be mounted therein and also to enable the electrical box assembly to meet the electrical code in those localities that require all electrical boxes containing electrical devices and wiring therein to be constructed of metal. The panels 40 further include fastener receiving apertures 42 and electrical contact points 44. The inner box 22 includes a back wall 46 and one or more removable wall portions 48 on the sidewalls 28 and back wall 46. The removable wall portions 48 may be removed when necessary to provide a hole for passage of wiring into the inner box 22. As depicted by line 50 in FIGS. 3 and 4, the front edge 30 of the sidewalls 28 of the inner box 22 are planar. Furthermore there is provided on the interior of the box, shown on the back wall 46, a grounding screw 52 for providing a connection point for later securing a ground wire to facilitate grounding of the metal inner box 22. The electrical code in some localities specifies that the electrical box housing wiring connections must be constructed of metal. The electrical box assembly of the present invention includes a metal inner box 22 and a grounding screw 52 to enable the assembly to satisfy the electrical code in those areas having the stricter code.

Figure 5:
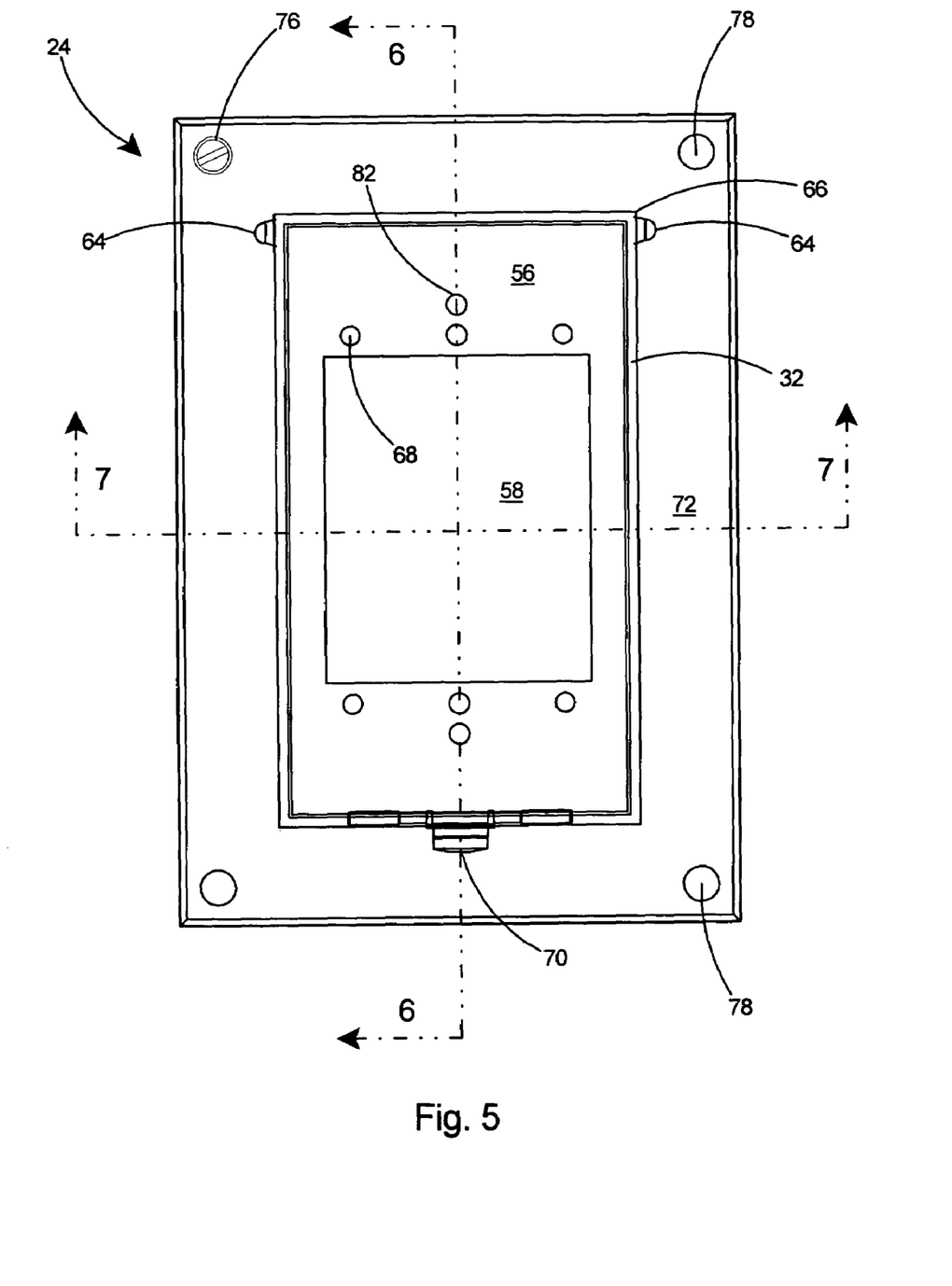
FIG. 5 is a front view of the outer box portion of the electrical box assembly of FIG. 1.
Figure 6:
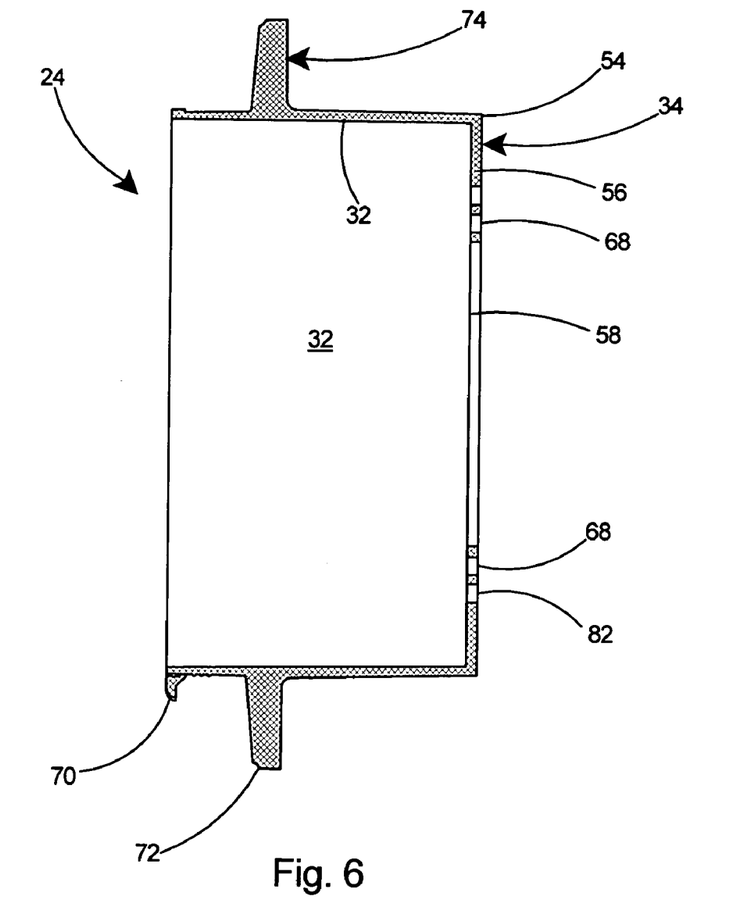
FIG. 6 is sectional view of the outer box taken along line 6—6 of FIG. 5.
Figure 7:
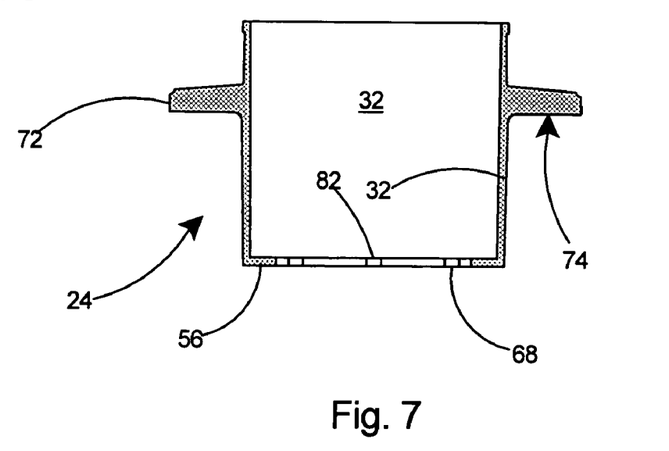
FIG. 7 is sectional view of the outer box taken along line 6—6 of FIG. 5.
Figure 8:
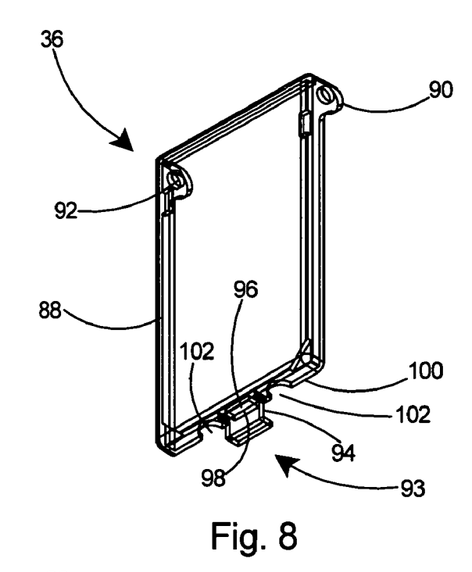
FIG. 8 is a rear perspective view of the cover member portion of the electrical box assembly of FIG. 1.
Figure 9:
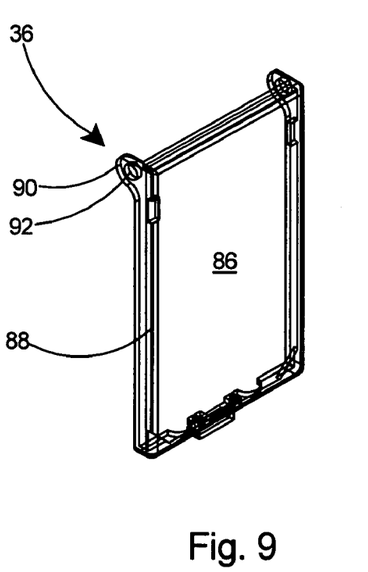
FIG. 9 is a front perspective view of the cover member.
Figure 10:
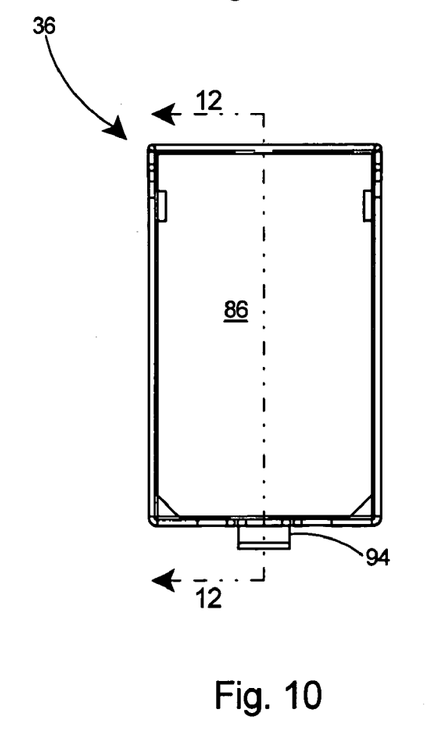
FIG. 10 is a front elevation view of the cover member.
Figures 11, 12:
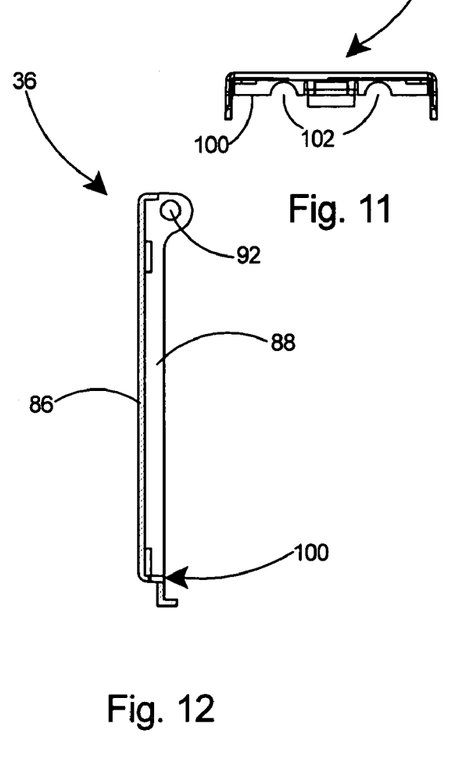
FIG. 11 is a bottom view of the cover member.
FIG. 12 is a section view of the cover member taken along line 12—12 of FIG. 10.

Referring to FIGS. 5–7, the sidewalls 32 of the outer box 24 include a rear edge 54 and a partial back wall 56 extending inwardly from the rear edge 54 (see FIGS. 6 and 7) forming a rear opening 58 therein. The partial back wall 56 includes a rear abutment surface 34. As shown in FIG. 5, the outer box 24 also includes pins 64 extending from the top end 66 of the sidewalls 32. The partial back wall 56 also includes apertures 68 for use in securing the outer box 24 to the inner box 22. A tab 70, which will be work in conjunction with a cover arrangement, is provided at the bottom of the outer box 24 with the tab 70 extending outwardly from the sidewalls 32. A flange 72 is provided on the outer box 24 extending outwardly from the sidewalls 32. The flange 72 is planar and includes a rear surface 74 for abutment against the surface of the building when the electrical box assembly is later mounted on a building. The flange 72 further includes a mounting arrangement 76 that will facilitate securing the electrical box assembly to a building with the mounting arrangement 76 including mounting apertures 78 in the flange 72 and mounting fasteners 80 for fastening through the mounting apertures 78 into the building. Electrical contact points 82 are provided on the partial back wall 56 to facilitate later connection of an electrical device (not shown) thereto.

With reference to FIGS. 8–12, the electrical box assembly further includes a cover member 36 that includes a front panel 86, sidewalls 88, ears 90 extending from the sidewalls 88, and apertures 92 in the ears 90. The electrical box assembly further includes a latch arrangement 93 for holding the cover 36 closed on the outer box 24. The latch arrangement 93 includes a downward extending latch 94 on the cover 36. The downward extending latch 94 is provided with an opening 96 and an exposed surface 98 that will function to lock the cover closed as will be described hereinafter. The sidewalls 88 of the cover 36 include a rear edge 100 and U-shaped slots 102 extend inwards at the rear edge 100.

Figure 13:
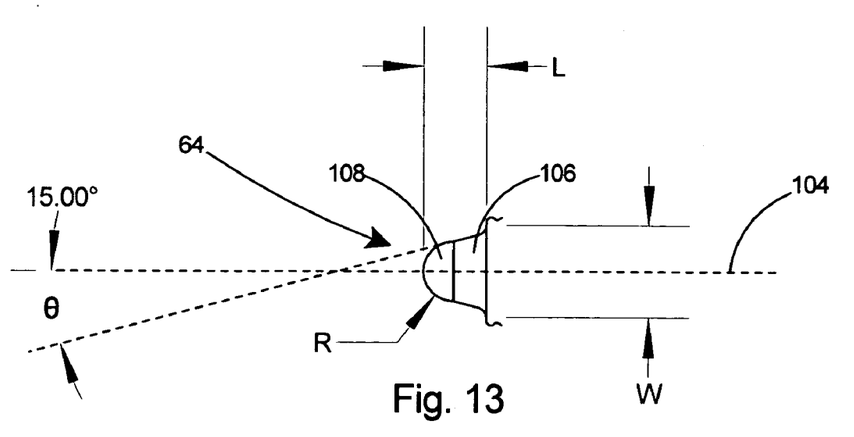
FIG. 13 is a detail view of the pin portion extending from the sidewall of the outer box portion of the electrical box assembly.

Referring to FIG. 13, the pins 64 on the outer box 24 include a longitudinal axis 104, a base portion 106, and a tip portion 108. The base portion 106 of the pins 64 includes a conical surface having an angle θ with respect to the longitudinal axis 104 and the tip portion 108 of the pins 64 includes a rounded surface.

Figure 14:
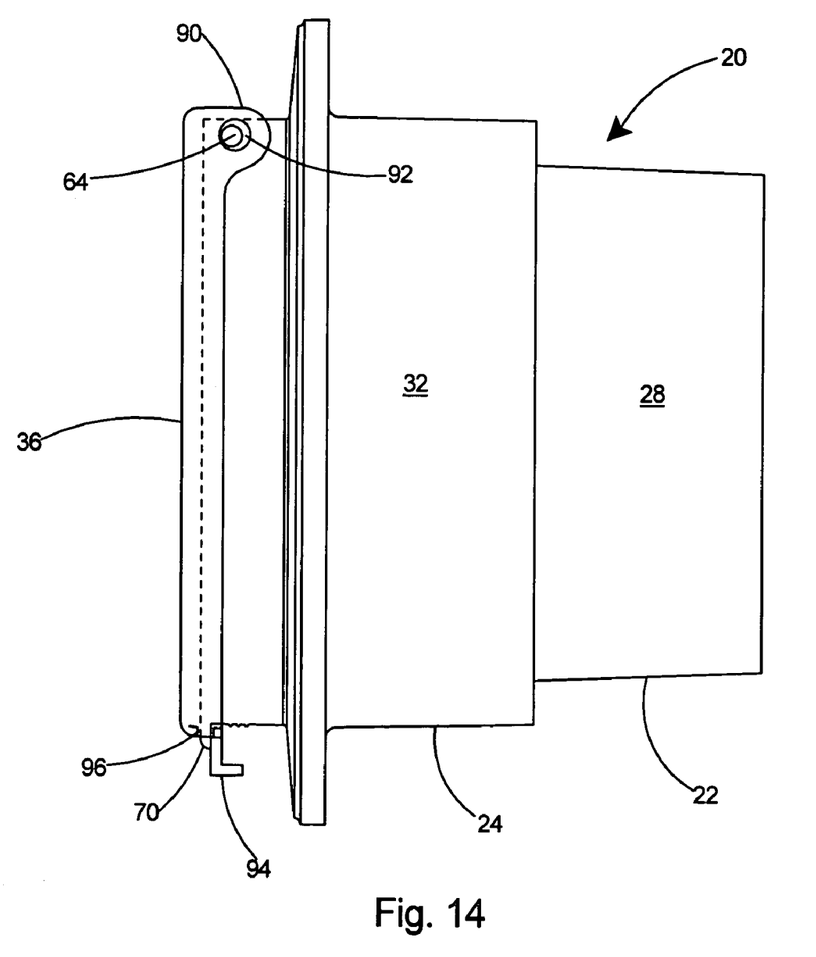
FIG. 14 is a side view of a recessed electrical box assembly according to the present invention with the cover in the closed position.

With reference to FIG. 14, the breakaway cover 36, which is typically molded of resilient plastic in one piece, is pressed over the pins 64 on opposing sides of the outer box 24. Being constructed of a resilient plastic, the ears 90 may be biased outwards and the cover 36 pressed upon the outer box 24 until the pins 64 snap into the apertures 92 in the ears 90.

Figure 15:
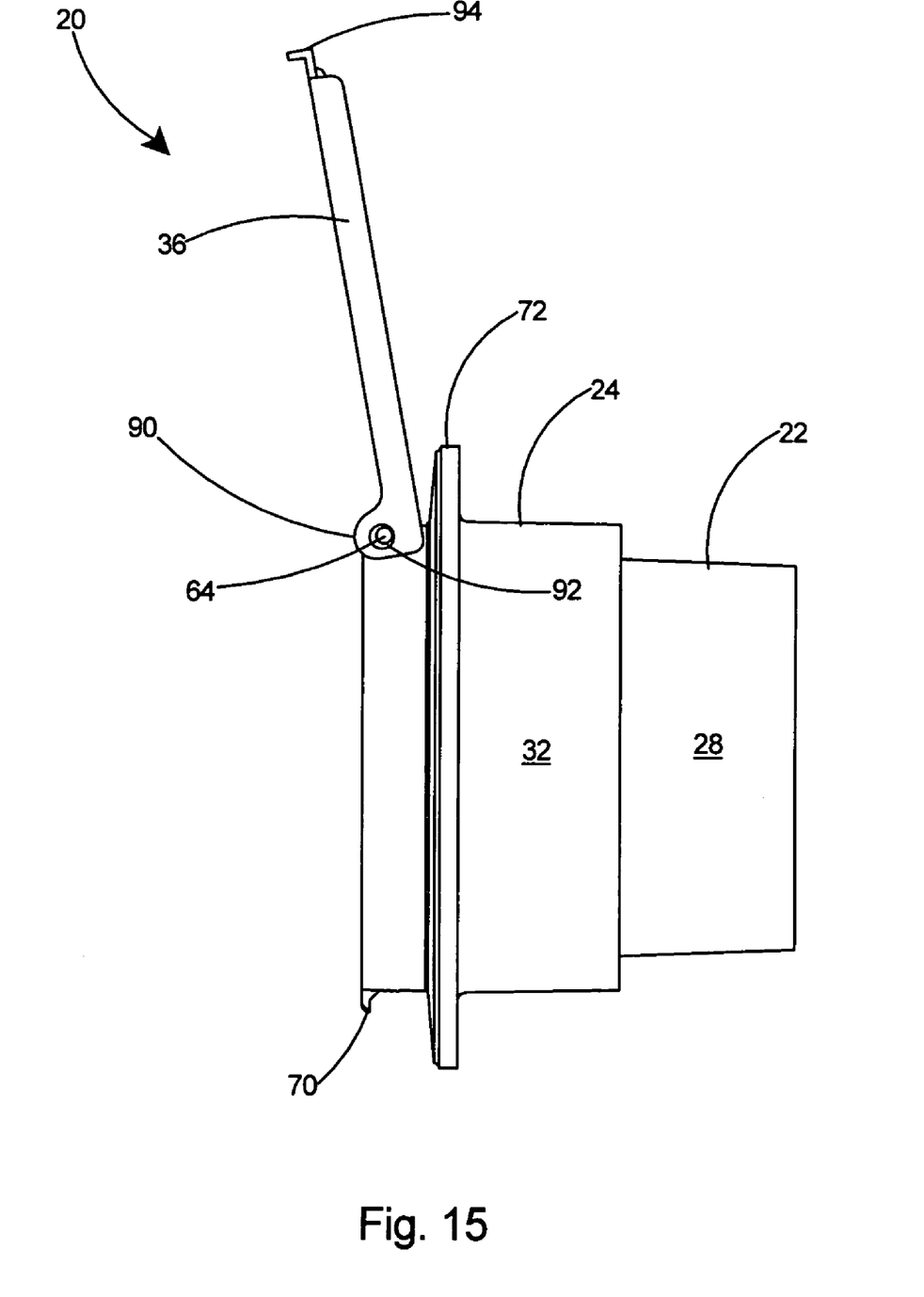
FIG. 15 is a side view of a recessed electrical box assembly according to the present invention with the cover in the open position.

When the cover 36 is in a raised or open position, such as shown in FIG. 15, as a result of the shape and design of the pins 64, an excessive force applied to the cover 36 will knock the cover 36 off of the pins and therefore protect the cover from breakage or other damage. The resilient properties of the cover 36 and the shape of the pins 64 cause the cover 36 to spread outwards in dimension at the ears 90 and thereby slip off of the pins 64 without damage to the cover.

With reference to FIG. 14, the cover 36 when closed upon the outer box 24 of the electrical box assembly 20 is held closed upon the outer box 24 by the tab 70 on the outer box 24 extending through the opening 96 on the cover 36. Details of the breakaway cover of the present invention are provided in U.S. patent application Ser. No. 11/246,985, entitled Recessed Outlet Box with Breakaway Cover, filed Oct. 7, 2005, the contents of which are incorporated by reference herein it its entirety.

With reference to FIG. 1, the fastening arrangement 35 for securing the outer box 24 to the inner box 22 includes the apertures 68 in the partial back wall 56 of the outer box 24, the fastener receiving apertures 42 in the inner box 22, and fasteners 110. To secure the outer box 24 to the inner box 22, the apertures 68 in the outer box 24 are placed in axial alignment with the fastener receiving apertures 42 in the inner box 22 and the fasteners 110 secured thereto. The fastener receiving apertures 42 in the inner box 22 can be threaded to receive the fasteners 110 or can be smooth bore for use with self-tapping fasteners. The fasteners 110 are secured through the apertures 68 in the partial back wall 56 of the outer box 24 into the fastener receiving apertures 42 in the inner box 22. After the outer box 24 and inner box 22 are secured together, the inner box 22 provides a metal electrical box 111 having a cavity therein for holding an electrical device and its associated wiring and the outer box 24 provides an outer enclosure for enclosing the plug ends of an electrical cord (not shown). Although it can be constructed of metal or plastic, the outer box 24 most preferably is molded of plastic in one piece. Preferably, the front edge 30 of the inner box 22 is planar and the rear abutment surface 34 of the outer box 24 is planar. Therefore, securing the outer box 24 to the inner box 22 with the fastening arrangement 35 will create a rainproof seal between the outer box 24 and the inner box 22.

Figure 17:
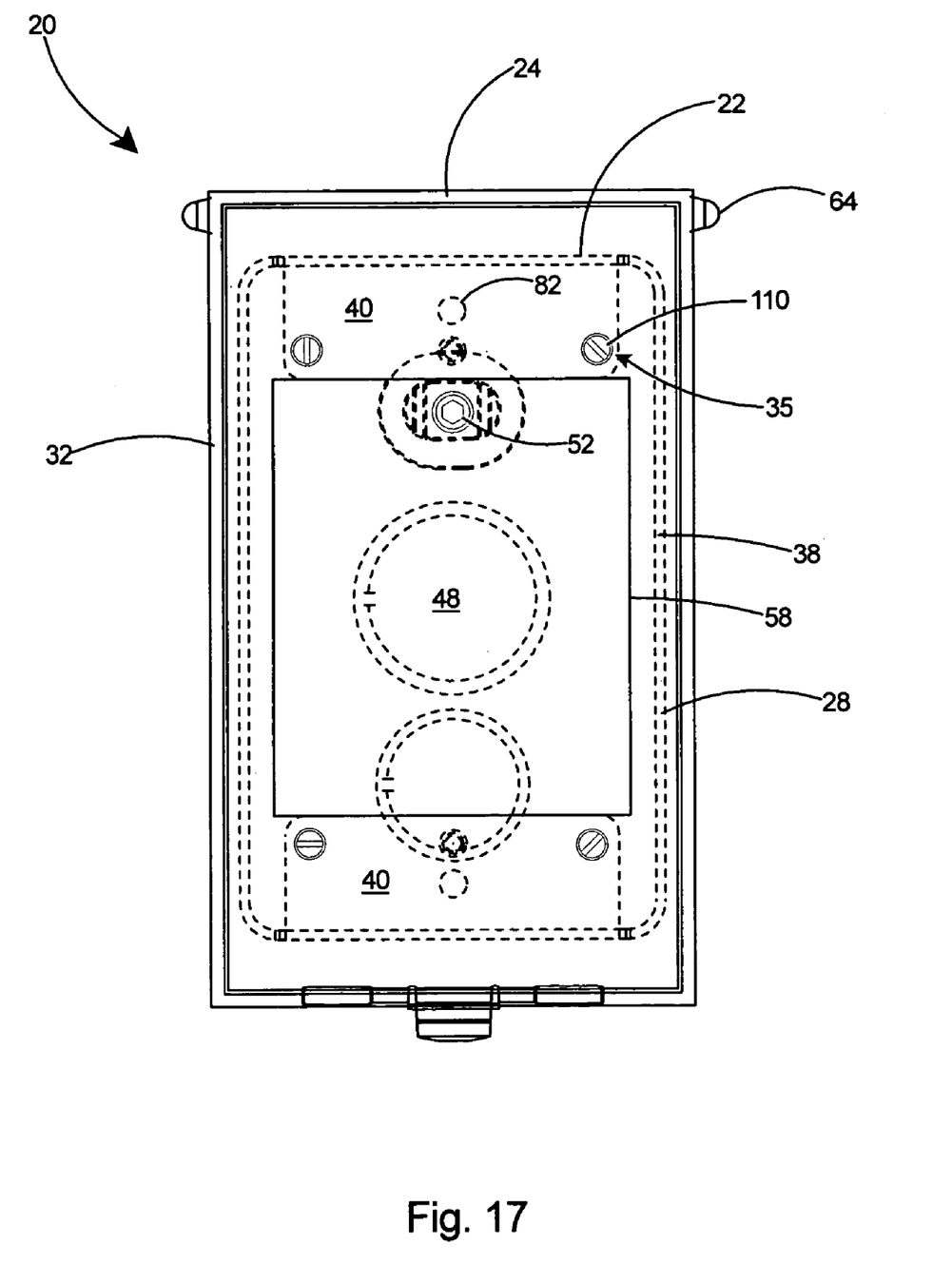
FIG. 17 is a front conceptual view of the outer box fitted onto the inner box.

Referring to FIG. 17, after the outer box 24 (shown in solid lines) and the inner box 22 (shown in broken lines) are secured together by the fastening arrangement 35, the rear opening 58 in the outer box 24 is equal to or smaller than the front opening 38 in the inner box 22 and no portion of the panels 40 or the sidewalls 28 of the inner box 22 extend within the rear opening in the outer box 24.

As shown in FIG. 1, the outer box 24 includes a front edge 112 and U-shaped slots 114 in the front edge 112 of the sidewalls 32.

Figure 18:
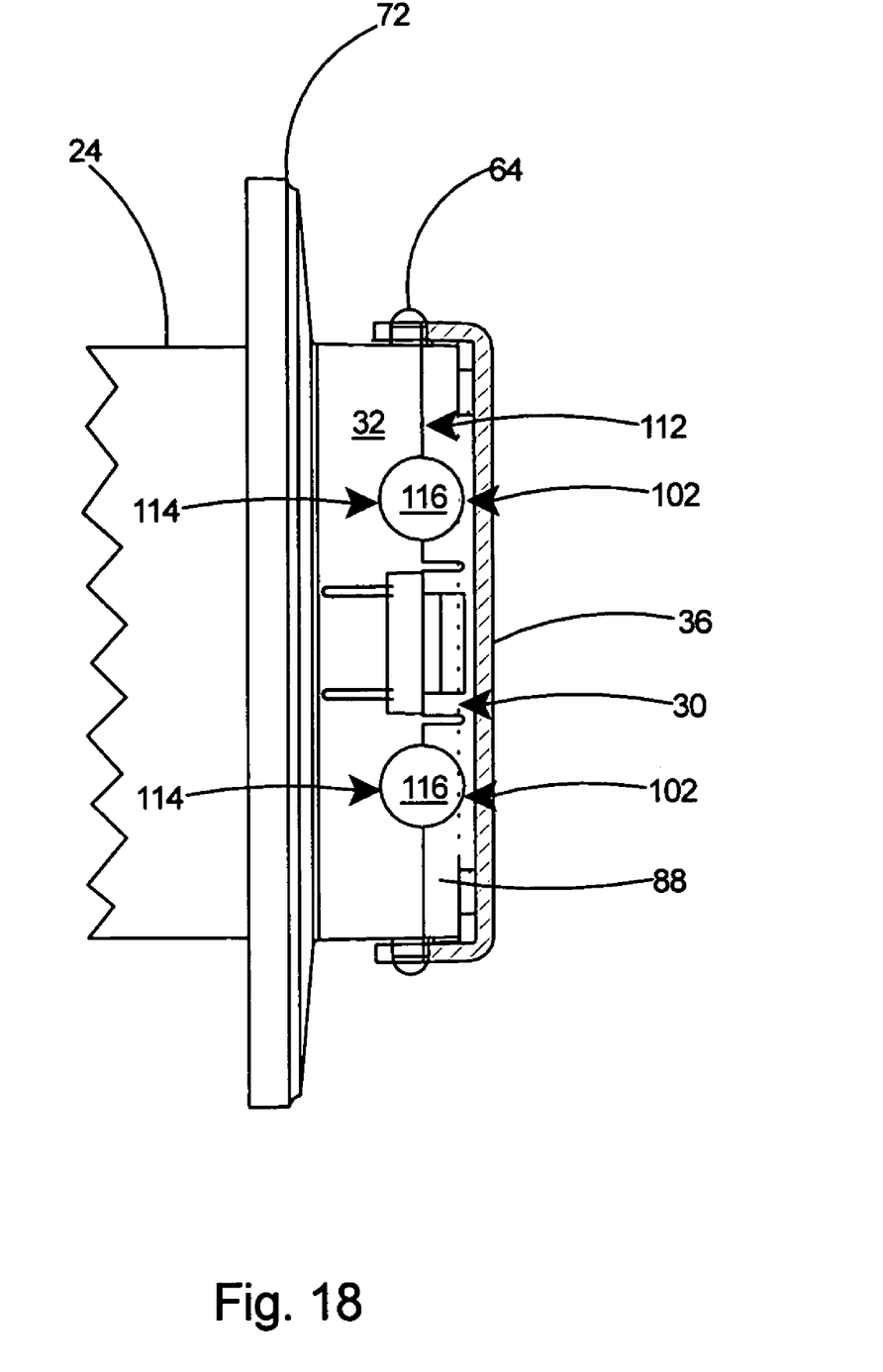
FIG. 18 is a bottom view of the recessed electrical box assembly of the present invention including the circular cord openings.

With reference to FIG. 18, after the cover 36 is closed upon the outer box 24 the U-shaped slots 114 in the front edge 112 of the sidewalls 32 of the outer box 24 and the U-shaped slots 102 in the sidewalls 88 of the cover 36 create substantially circular openings 116 therein for passage of electrical cords (not shown).

Figure 19:
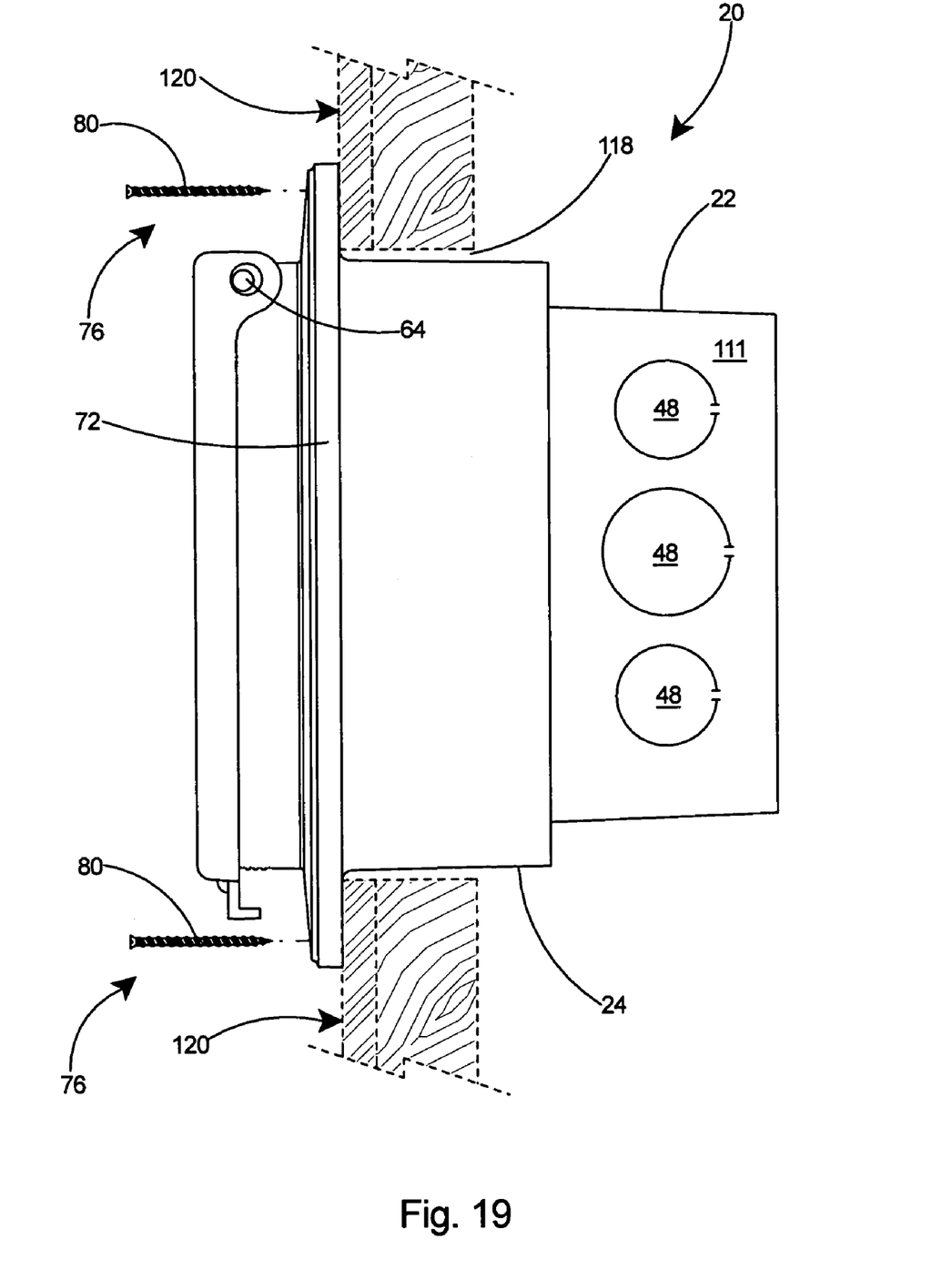
FIG. 19 is a side view depicting the recessed electrical box assembly of the present invention installed in a wall of a building.

As shown in FIG. 19, the electrical box assembly 20 of the present invention is adapted for insertion into a hole 118 in the surface 120 of a building. To operate the invention, a hole 118, large enough to accommodate the inner box 22 and outer box 24, is formed in the surface 120. One or more of the removable wall portions 48 can then be removed and wiring (not shown) fed into the electrical box portion 111 of the assembly 20. The electrical box assembly 20 is then inserted into the hole 118 until the rear surface 74 of the flange 72 contacts the surface 120. The mounting arrangement 76 is then used to secure the electrical box assembly to the building, with the mounting fasteners 80 secured through the mounting apertures 78 in the flange 72 and into the surface 120.

With reference to FIG. 1, the installer can then complete wiring connections (not shown) to an electrical device, such as the duplex outlet 26 shown. The duplex outlet 26 can then be secured to the electrical contact points 44 (see FIG. 2) in the inner box 22 with electrical device fasteners 124 and a faceplate 126 installed thereon to complete the installation of the electrical box assembly 20.

Having thus described the invention with reference to a preferred embodiment, it is to be understood that the invention is not so limited by the description herein but is defined as follows by the appended claims.

What is claimed is:

1. An electrical box assembly comprising:
   a two-piece box assembly including an inner box and an outer box;
   said inner box constructed of metal and including sidewalls having a front edge;
   said outer box including sidewalls having a front edge, a flange extending outwardly from said sidewalls of said outer box a substantial distance behind said front edge, pins including a width and extending from said sidewalls of said outer box, and a rear abutment surface;
   a fastening arrangement for securing said outer box to said inner box to form said two-piece box assembly, said outer box secured to said inner box in such a manner that said rear abutment surface of said outer box abuts said front edge of said inner box;
   a breakaway cover including apertures therein, said apertures in said cover having a larger diameter than said width of said pins;
   said cover attached at said front edge of said outer box with said pins of said outer box extending through said apertures of said cover and capable of being moved from an open to a closed position;
   electrical contact points at said front edge of said inner box; and said sidewalls of said outer box extending a substantial distance behind said flange thereby positioning an electrical device connected thereto a substantial distance within a wall.

2. The electrical box assembly of claim 1 wherein
said sidewalls of said outer box include a rear edge; and
a partial back wall extending inwardly from said rear edge of said outer box and forming a rear opening therein.

3. The electrical box assembly of claim 2 wherein
said partial back wall of said outer box includes a rear surface, and
said rear surface of said partial back wall includes said rear abutment surface.

4. The electrical box assembly of claim 3 including
a front opening on said inner box; and
panels extending orthogonally from said front edge of said inner box into said front opening.

5. The electrical box assembly of claim 4 wherein said fastening arrangement for securing said outer box to said inner box includes
fastener receiving apertures on said panels of said inner box;
apertures on said partial back wall of said outer box;
said apertures in said outer box in axial alignment with said fastener receiving apertures in said inner box; and
fasteners for securing through said apertures in said outer box into said fastener receiving apertures in said inner box.

6. The electrical box assembly of claim 1 wherein said inner box includes removable wall sections therein.

7. The electrical box assembly of claim 1 wherein said outer box is molded of plastic in one piece.

8. The electrical box assembly of claim 1 wherein
said cover includes an open position; and
said cover in said open position is capable of breaking away from said outer box upon application of an excessive force thereto, said cover breaking away by slipping off of said pins.

9. The electrical box assembly of claim 1 wherein
said pins of said outer box extend through said apertures in said cover to pivotally attach said cover to said outer box.

10. The electrical box assembly of claim 9 wherein
said pins include a longitudinal axis, a base portion, and a tip portion;
said base portion of said pins include a non-cylindrical surface having an angle with respect to said longitudinal axis; and
said tip portion of said pins include a rounded surface.

11. The electrical box assembly of claim 1 wherein
said front edge of said inner box is planar;
said rear abutment surface of said outer box is planar; and
securement of said outer box to said inner box creates a rainproof seal between said planar rear abutment surface of said outer box and said planar front edge of said inner box.

12. The electrical box assembly of claim 4 wherein
said rear opening in said outer box is equal to or smaller than said front opening in said inner box; and
no portion of said panels or said sidewalls of said inner box extend beyond said rear opening in said outer box.

13. The electrical box assembly of claim 1 wherein
said electrical box assembly is adapted for insertion into a hole in the surface of a building;
said flange includes a rear surface; and
said rear surface of said flange is planar for abutment against said surface of said building.

14. The electrical box assembly of claim 1 including a latch arrangement for holding said cover closed on said outer box.

15. The electrical box assembly of claim 1 including a grounding screw secured to said sidewalls of said inner box.

* * * * *